(12) United States Patent
Blochmann et al.

(10) Patent No.: US 8,118,587 B2
(45) Date of Patent: Feb. 21, 2012

(54) METHOD FOR TRANSFERRING PREFORMS TO A BLOW MOLDING MACHINE AND MOLD CARRIER FOR AT LEAST ONE PREFORM

(75) Inventors: Erik Blochmann, Neutraubling (DE); Josef Penninger, Oberinkofen (DE); Hans-Juergen Fleischmann, Steinberg am See (DE)

(73) Assignee: Krones AG, Neutraubling (DE)

( * ) Notice: Subject to any disclaimer, the term of this patent is extended or adjusted under 35 U.S.C. 154(b) by 85 days.

(21) Appl. No.: 12/431,862

(22) Filed: Apr. 29, 2009

(65) Prior Publication Data

US 2009/0273118 A1  Nov. 5, 2009

(30) Foreign Application Priority Data

Apr. 30, 2008 (DE) .......................... 10 2008 021 526

(51) Int. Cl.
*B29C 49/48* (2006.01)
*B29C 31/08* (2006.01)

(52) U.S. Cl. ......... 425/534; 425/522; 425/540; 425/541

(58) Field of Classification Search .................. 425/522, 425/534, 540, 541; 264/538
See application file for complete search history.

(56) References Cited

U.S. PATENT DOCUMENTS

| 2,715,751 | A | * | 8/1955 | Weber | 264/530 |
| 3,415,915 | A | * | 12/1968 | Lecluyse et al. | 264/535 |
| 3,465,073 | A | * | 9/1969 | Fogelberg et al. | 264/543 |
| 3,977,822 | A | * | 8/1976 | Reilly et al. | 425/529 |
| 4,151,247 | A | * | 4/1979 | Hafele | 264/328.16 |
| 4,317,793 | A | * | 3/1982 | Hubert et al. | 264/521 |
| 4,850,850 | A | * | 7/1989 | Takakusaki et al. | 425/526 |
| 5,509,796 | A | * | 4/1996 | Di Settembrini | 425/526 |
| 6,390,802 | B1 | * | 5/2002 | Zoppas | 425/540 |
| 6,770,238 | B2 | * | 8/2004 | Choinski | 264/535 |
| 6,824,731 | B1 | * | 11/2004 | Zoppas | 264/523 |
| 6,918,754 | B2 | | 7/2005 | Albrecht | |
| 6,948,924 | B2 | * | 9/2005 | Tsau et al. | 425/195 |
| 7,998,396 | B2 | * | 8/2011 | Rousseau et al. | 264/523 |
| 2008/0113061 | A1 | | 5/2008 | Stoiber et al. | |

FOREIGN PATENT DOCUMENTS

| DE | 199 06 438 A1 | 8/2000 |
| DE | 69918692 T2 | 1/2005 |
| DE | 202004015066 U1 | 1/2005 |
| DE | 10 2005 008 685 A1 | 9/2006 |
| DE | 202004021755 U1 | 9/2010 |

(Continued)

*Primary Examiner* — Robert B Davis
(74) *Attorney, Agent, or Firm* — Simpson & Simpson, PLLC

(57) ABSTRACT

A method for transferring a plurality of preforms to a blow molding machine having a plurality of mold carriers, wherein each mold carrier is arranged to carry at least one multi-part blow mold, the method including the steps of transferring the preforms along a transfer section to the blow molding machine, opening at least one of the mold carriers as it reaches the transfer section, transferring at least one preform located at the transfer section to a holding element assigned to the open mold carrier, positioning the preform in the at least one blow mold of the mold carrier, closing the mold carrier with the preform positioned therein, wherein part of the blow mold in the closed state of the mold carrier being formed by the holding element, and repeating the previous steps for each of the preforms supplied to the blow molding machine via the transfer section.

5 Claims, 8 Drawing Sheets

FOREIGN PATENT DOCUMENTS

| | | |
|---|---|---|
| EP | 1 276 598 B1 | 8/2005 |
| FR | 2914580 A1 * | 10/2008 |
| WO | WO 00/48818 | 8/2000 |
| WO | 0107235 | 2/2001 |

* cited by examiner

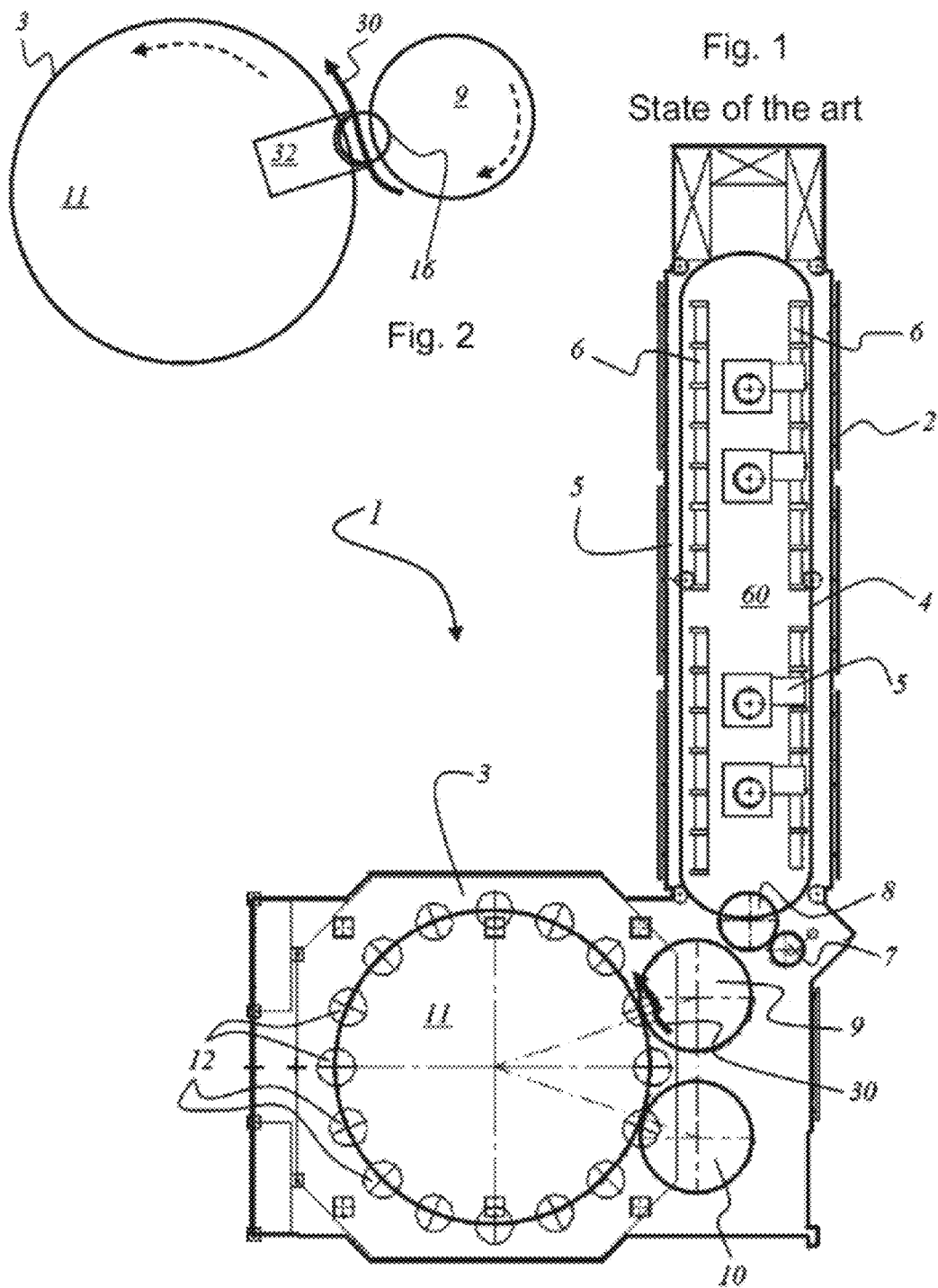

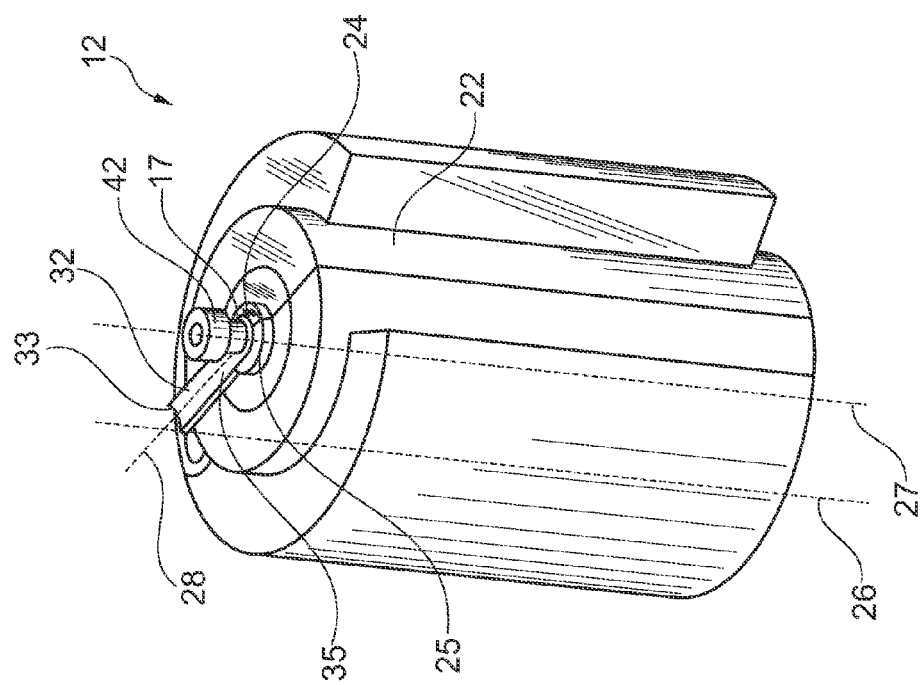
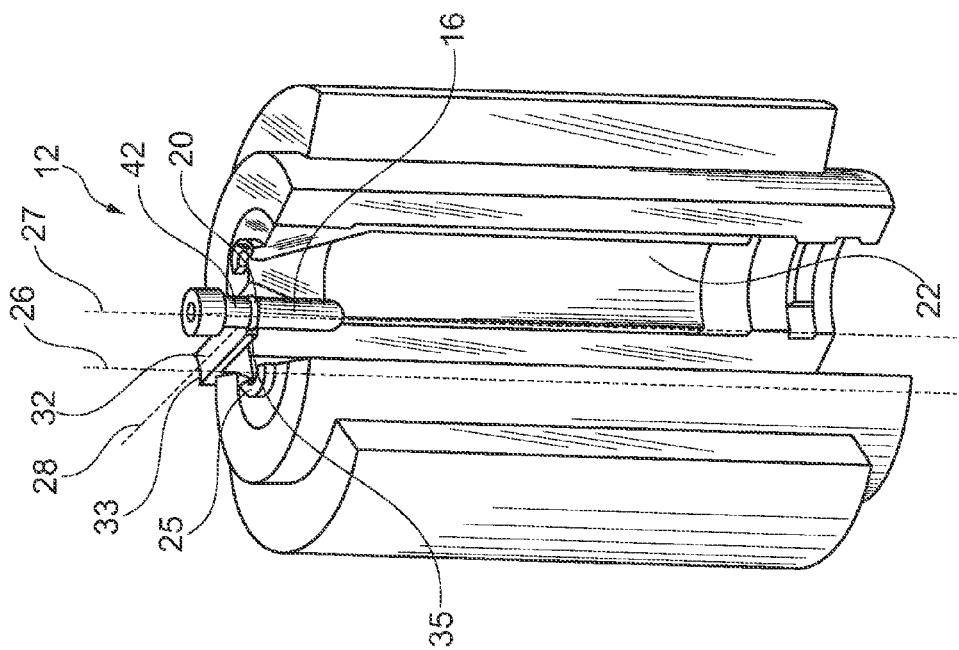

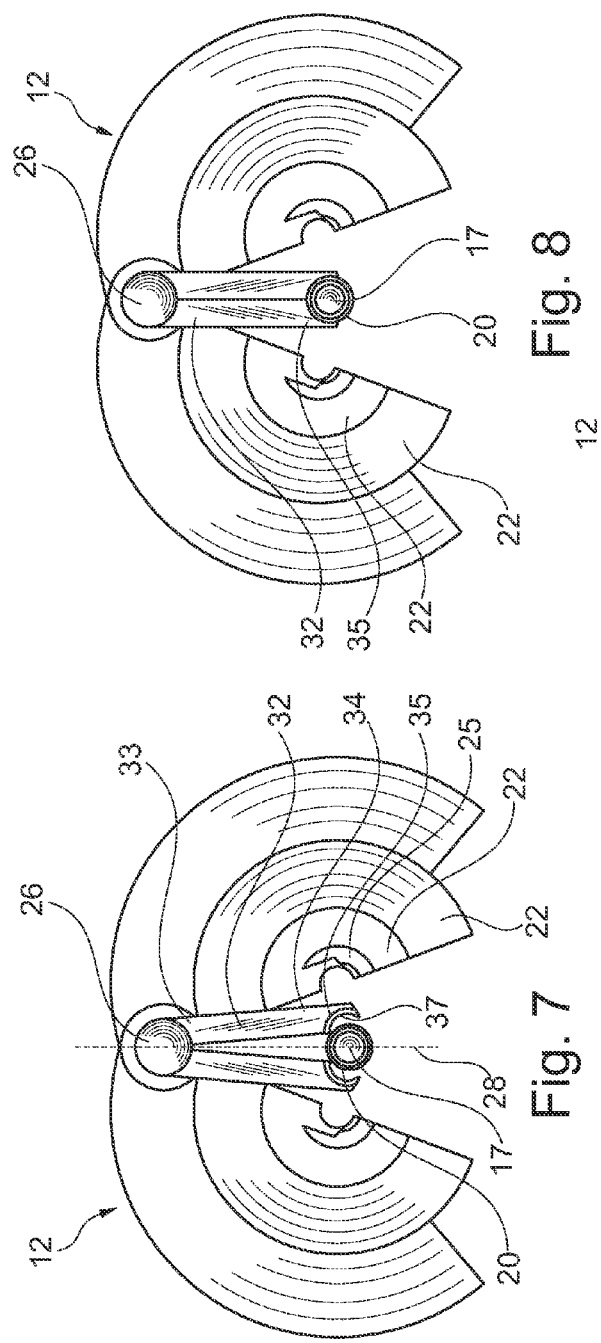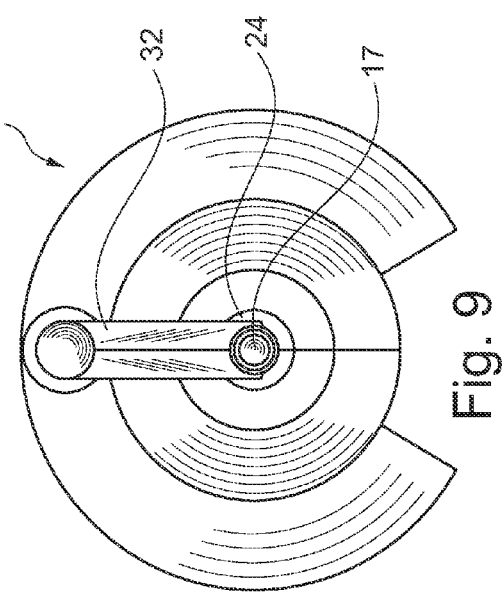

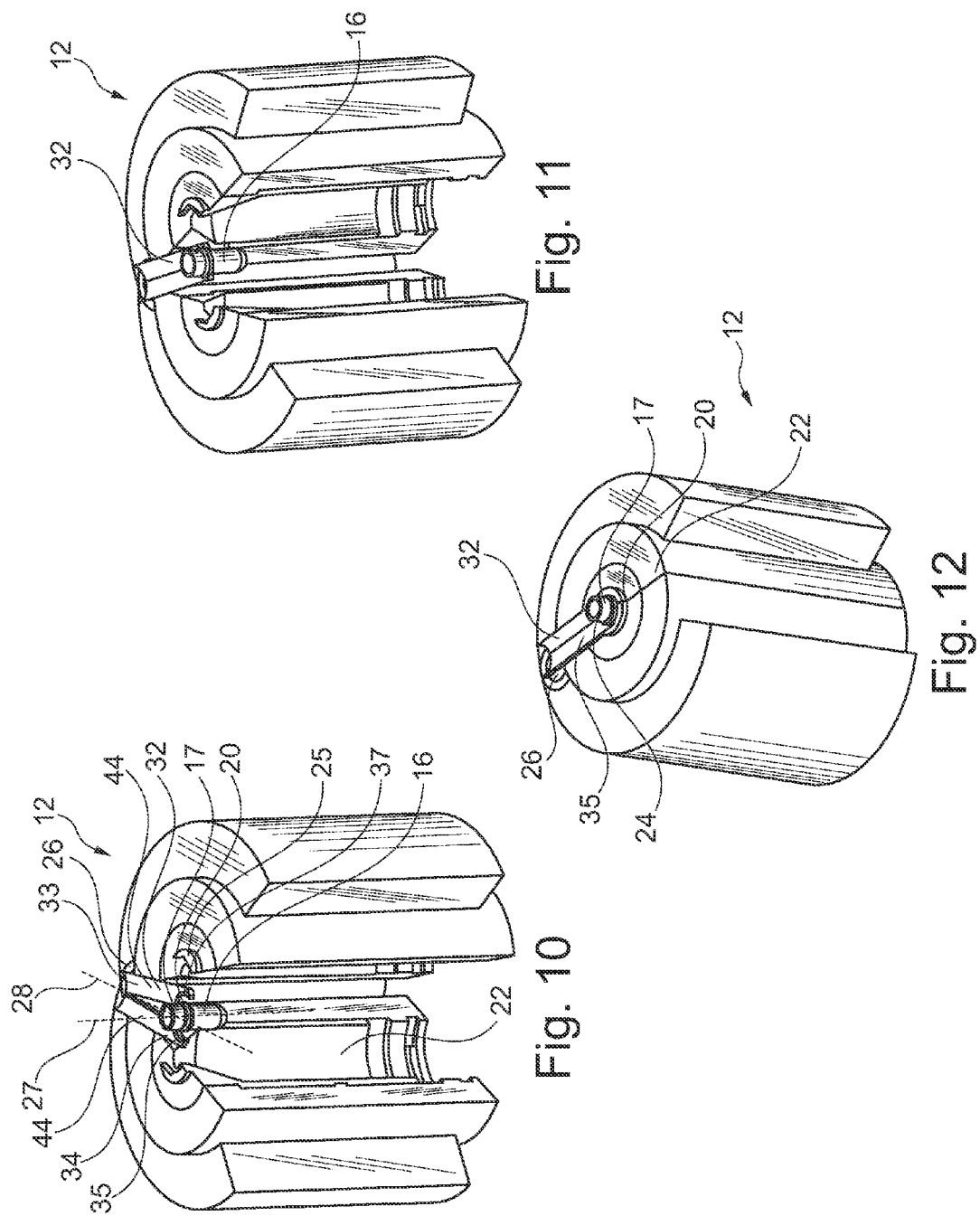

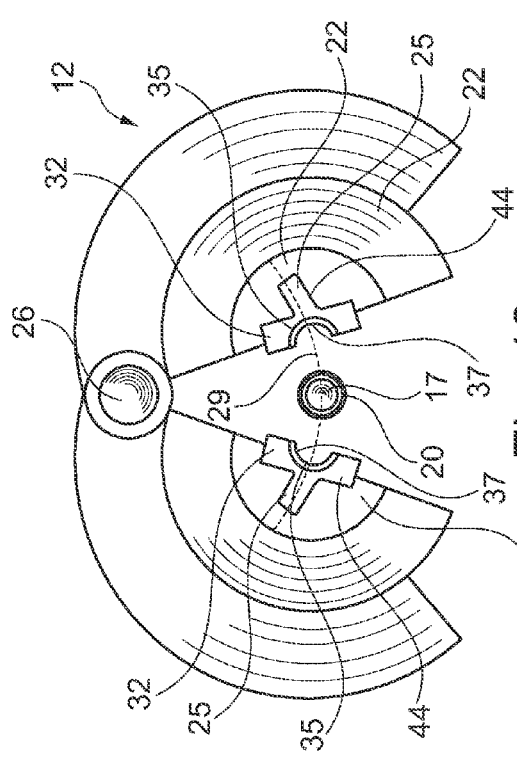
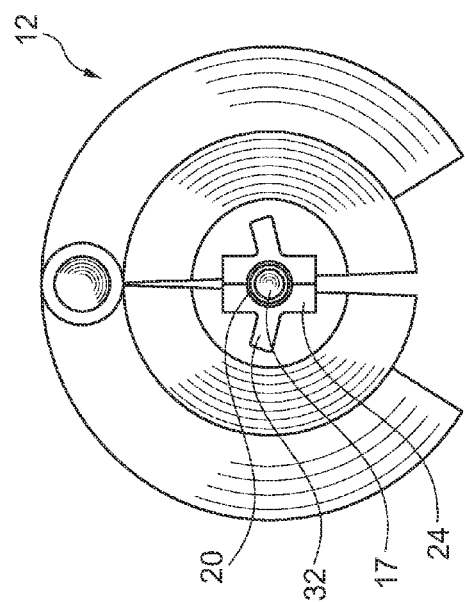
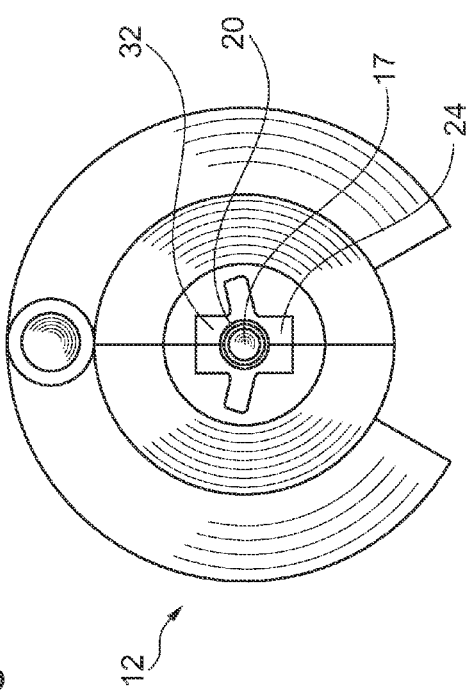
Fig. 13
Fig. 14
Fig. 15

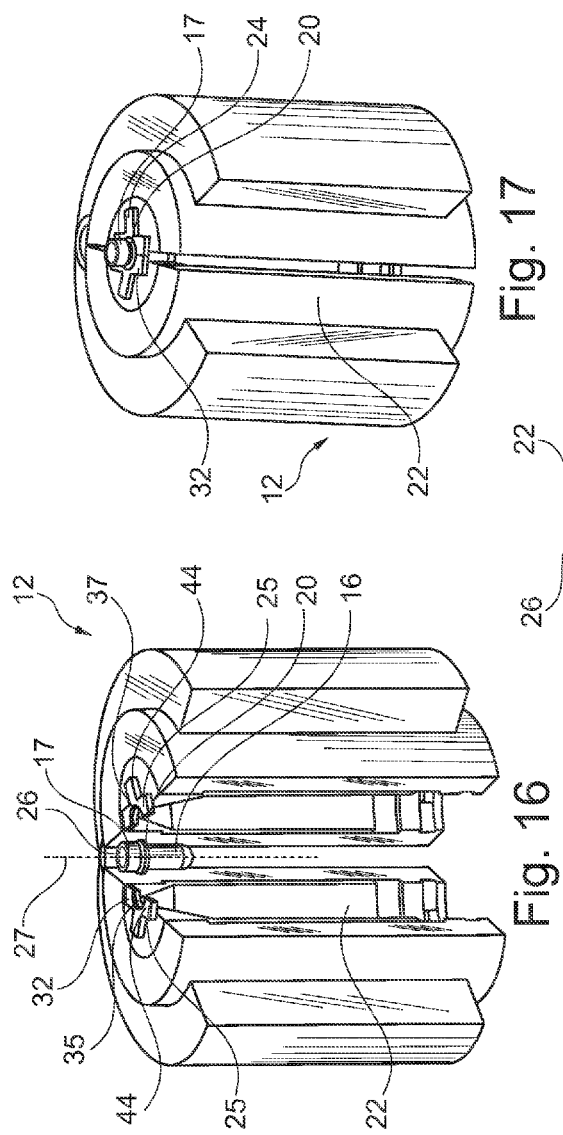

METHOD FOR TRANSFERRING PREFORMS TO A BLOW MOLDING MACHINE AND MOLD CARRIER FOR AT LEAST ONE PREFORM

CROSS REFERENCE TO RELATED APPLICATIONS

This patent application claims priority of German Patent Application No. DE 10 2008 021 526.0, filed on Apr. 30, 2008, which application is incorporated herein by reference in its entirety.

FIELD OF THE INVENTION

The present invention relates to a method for transferring preforms to a blow molding machine. In particular, the invention relates to a method for transferring preforms to a blow molding machine which comprises a plurality of mold carriers, each of which carries at least one multi-part blow mold. In said method, a respective preform is transferred along a transfer section to the blow molding machine. To this end, firstly the mold carrier assigned to the preform is opened as it reaches the transfer section. If necessary, a finished, shaped liquid container is removed from the blow mold before the preform is inserted. The preform which is likewise located at the transfer section is then transferred to a holding element assigned to the open mold carrier. The preform is then positioned in the blow mold of the mold carrier and the mold carrier is then closed. These steps are carried out for each of the preforms supplied to the blow molding machine via the transfer section.

The invention also relates to a mold carrier for at least one preform. In particular, the invention relates to a mold carrier within a blow molding machine, wherein at least one multi-part blow mold is arranged in the mold carrier and the mold carrier comprises at least one holding element.

BACKGROUND OF THE INVENTION

A blow molding machine is used in particular for the stretch-blow molding of preforms. As a result of the stretch-blow molding of the preforms, liquid containers, for example bottles, are produced. The blow molding machine itself comprises a plurality of blow molds, each blow mold being seated in a mold carrier. For the stretch-blow molding of preforms for plastic bottles, use is made of blow molds in which a preform is mold-blown, i.e., contoured, using gauge pressure in the interior of the blow mold. The blow mold consists at least of two blow mold halves which are held in the mold carrier. In this case, the mold carrier comprises two mold carrier halves which are mounted such that they can pivot around a common axis. By pivoting around this axis, the mold carrier halves can be opened and closed. A preform can be inserted into the open mold carrier halves and thus also into the open blow mold, and a mold-blown bottle can respectively be removed from the open blow mold. The configuration of such a mold carrier is disclosed for example in the European Patent No. EP 1 276 598 B1.

During the phase of transferring the preform to the mold carrier of the blow molding machine and correspondingly during the phase of removing the bottle, the preform or the container is guided along a transfer section (escort section). During transfer, usually a transfer device grips at least part of the neck region of the preform. The transfer section thus leads both along part of the circumference of the blow molding machine and also along part of the circumference of an adjoining processing device arranged upstream or downstream. In this way, the preform is moved from a polar coordinate system of the processing device into a different polar coordinate system of the blow molding machine, or the preform is moved from the polar coordinate system of the blow molding machine into the polar coordinate system of the processing device.

During transfer or removal, the movement direction of the preform sometimes differs considerably from that of the blow molding machine or of the processing device. As a result, at an ideally constant high speed, the preform is exposed to high loads which may lead to damage on the preform. The reliable transfer of the preform can also be put at risk by significant changes to the movement direction of the preform. The same also applies to removal of the liquid containers. However, the requirements in terms of productivity and thus in terms of the speed at which the preforms or liquid containers are to be processed are increasing, and therefore the abovementioned problems are becoming more pronounced.

German Patent Application No. DE 10 2005 008 685 A1 discloses a method and an apparatus for the blow molding of containers, which support a compact construction. Preforms are heated in the region of a heating section. The heated preforms are then transferred to a rotating blowing wheel, on which they are shaped by stretch-blow molding within blow molds to form the containers. The preforms are transported from the heating section until they are a small distance away from the blowing wheel. In a transfer region of the preforms from the heating section to the blowing wheel, the heating section is at a small distance from the blowing wheel. At least one transfer device is used for directly transferring the preforms from the heating section to the blowing wheel. A transfer of the preforms is therefore carried out directly from the heating section to the blowing wheel, without using a transfer starwheel, handover wheel or other suitable transfer means arranged movably between the heating device for heating the preforms and the blowing wheel for stretch-blow molding the preforms to form the containers. The transfer device preferably comprises a gripper device which moves the preform from the heating section to the blowing wheel and/or moves the container produced from the preform to a transfer wheel for outputting the container.

German Patent Application No. DE 199 06 438 A1 discloses a method and an apparatus for transferring containers after blow molding the containers from a thermoplastic material. After blow molding, the blown containers are fed by an output wheel to an output section having at least two separate transport paths. The containers are fed one after the other to the output wheel in the circumferential direction of the output wheel. The containers are introduced into the output section after carrying out a pivoting movement in the radial direction relative to a center point of the output wheel essentially with containers arranged next to one another. The output wheel has at least one holding element for simultaneously holding at least two blown containers. The holding elements are arranged so that their position can vary relative to the output wheel in such a way that holders of the holding element for the containers are arranged one behind the other in the circumferential direction of the output wheel during input of the containers and are arranged next to one another in the circumferential direction during output of the containers. In the region of the output wheel, by virtue of the invention it is possible to handle the blown containers with high reliability and at high speed.

BRIEF SUMMARY OF THE INVENTION

The object of the invention is to provide a method which allows a fast and reliable transfer and/or removal of an object being processed to and/or from a mold carrier of a blow molding machine.

The above object is achieved by a method for transferring a plurality of preforms to a blow molding machine which comprises a plurality of mold carriers, each of which carries at least one multi-part blow mold, comprising the following steps: transferring the preforms along a transfer section to the blow molding machine; opening at least one of the mold carriers as it reaches the transfer section; transferring at least one preform which is likewise located at the transfer section to a holding element assigned to the open mold carrier; positioning the preform in the at least one blow mold of the mold carrier; closing the mold carrier with the preform positioned therein, part of the blow mold in the closed state of the mold carrier being formed by the holding element; and, carrying out the steps described above for each of the preforms supplied to the blow molding machine via the transfer section.

Another object of the invention is to provide a mold carrier used in a blow molding machine for an object being processed, so that the mold carrier allows a fast and reliable transfer to the mold carrier and/or a fast and reliable removal of the object being processed from the mold carrier.

The above object is achieved by a mold carrier for at least one preform, characterized in that the mold carrier is arranged within a blow molding machine, comprising at least one multi-part blow mold and at least one holding element, wherein the at least one holding element forms at least part of the at least one multi-part blow mold in the closed state of the mold carrier.

The method according to the invention serves for transferring a plurality of preforms to a blow molding machine which comprises a plurality of mold carriers according to the invention. Each mold carrier carries at least one multi-part blow mold. As described above, the preforms are transferred along a transfer section to the blow molding machine. As they reach the transfer section, preferably even before they reach the transfer position, the mold carriers are opened for the preforms, as a result of which the transfer section for the preform is considerably shortened. A respective preform which is likewise located at the transfer section is transferred at the transfer position to a holding element assigned to the respective open mold carrier.

If a mold carrier in one embodiment of the mold carrier comprises two blow molds for two preforms, each blow mold is assigned a respective holding element. Only the embodiments with one blow mold for one preform per mold carrier will be described below, without limiting the invention.

The preform is then positioned in the blow mold of the mold carrier and the mold carrier with the preform positioned therein is then closed. The particular advantage of the invention lies in the fact that part of the blow mold in the closed state of the mold carrier is formed by the holding element. The holding element, in particular a part of the underside thereof, is thus involved in the shaping of the preforms into containers during the stretch-blow molding process. The holding elements hold the preforms at in each case a predefined position within the blow molds. By virtue of the holding element, the above-described transfer section is shortened and thus the preform is exposed to lesser loads.

The steps described above are repeated for each of the preforms supplied to the blow molding machine via the transfer section.

In one embodiment of the method according to the invention, the preform is deposited in the holding element of the mold carrier in such a way that an axis of the preform is essentially parallel to the axis of the blow mold of the mold carrier. In further embodiments of the invention, the respective preform is fixed radially relative to its cross-sectional area and/or axially relative to the axis of the preform. To this end, various embodiments of the mold carrier are conceivable, which will be described in later sections.

In one embodiment of the method according to the invention, the containers produced from the preforms after the stretch-blow molding process has taken place are removed from the respective holding elements of the mold carriers and transferred to a subsequent processing device. The above-described positioning and/or support of the preforms in the holding elements and/or the removal of the containers produced from the preforms from the holding elements can be controlled automatically.

The mold carrier according to the invention is arranged within the above-described blow molding machine. One or more blow molds for in each case one preform are arranged in the mold carrier. Each of the blow molds consists of multiple parts and comprises at least one holding element. In this case, the holding element forms at least part of the respective multi-part blow mold when the mold carrier is closed. Usually, a first end of the holding element is connected to an axis of the respective blow mold. A second end of the holding element has a holder for the preform, for example a pair of tongs, which holds the preform. If each preform has a carrying ring, also known as a neck ring, according to the prior art, the holder holds the preform along its carrying ring.

Since the holding element in the closed state of the mold carrier forms part of the blow mold, the holding element is involved at least partially in the shaping of the preform in the mold carrier during the stretch-blow molding process, in particular in the shaping in a region around the carrying ring between the head region and the body of the preform.

The holding element may essentially consist of one part or multiple parts. If the holding element consists of one part, the holder should have an inner edge, the length of which is at most half the circumference of the preform. If the inner edge is longer than half the circumference of the preform but the holder consists of one part, the holder would not be able to engage around the preform and hold it without gaps. The preform would not fit the gripping tongs without gaps. FIG. 4 illustrates the problem.

In another embodiment, the holding element consists of multiple parts. In particular, it may consist of two movable holding element halves which form a pair of tongs. In the open state of the tongs, the preform is introduced into the tongs. Alternatively, the tongs move and actively grip the preform. In the closed state of the tongs, said tongs securely hold the preform. In contrast to the one-part holding element, the length of the inner edge of the tongs can now be more than half the circumference of the preform (see FIG. 8), since the two-part tongs can be opened, unlike the one-part holding element. During the opening of the tongs, an opening which is wider than the diameter of the preform is obtained, which is sufficient for gripping the preform.

Blow molds from the prior art often comprise in each case a so-called neck plate, on which the carrying ring of the respective preform is deposited without gaps. Such a neck plate forms the upper end of the blow mold. In one embodiment of the mold carrier according to the invention, the neck plate is used as the holding element for the preform. The neck plate consists of two neck plate halves, each neck plate half being arranged on the upper end of a respective half of the blow mold. If the two halves of the blow mold are closed, the two neck plate halves are also closed. In the closed state, the two neck plate halves form the neck plate, which encloses at least a circumferential region of the preform inserted in the blow mold. The neck plate halves can in each case be mounted in a fixed position on the respective half of the blow mold.

If the holding element is mounted in a fixed position to the mold carrier, for example in the embodiment with the neck plate as the holding element or the above-described one-part holding element, it is advantageous to additionally assign to each blow mold a support element, by means of which the preform positioned in the blow mold is fixed or supported axially relative to its axis. The support element is arranged above the preform located in the blow mold and thus holds and guides from above the head of the preform. The underside of the support element therefore holds and guides the upper end of the preform. Such a support element is particularly useful if the preform is otherwise supported only radially in the blow mold and if the carrying ring of the preform is not also clamped in some other way from above.

The holder may have a rest and a stop for the carrying ring, so that the carrying ring of the preform lies against the rest and is positioned radially by the stop at its outer edge. The stop may also be formed as a groove, so that the carrying ring can be clamped into the groove of the stop.

Examples of embodiments of the invention, and the advantages thereof, will be explained in more detail below with reference to the appended figures.

BRIEF DESCRIPTION OF THE DRAWINGS

There are numerous ways of advantageously developing and improving the teachings of the present invention. In conjunction with the description of the preferred exemplary embodiments of the invention with reference to the drawings, generally preferred embodiments and improvements to the teachings will also be explained.

In the drawings:

FIG. 1 shows a schematic view of an apparatus according to the prior art comprising a blow molding machine which is connected to an oven that supplies the preforms to the blow molding machine at a defined temperature;

FIG. 2 shows a schematic view of one embodiment of a one-part holding element which transfers a preform from an input position of the blow molding machine via a transfer section to the blow molding machine;

FIG. 5 shows a perspective view of the open mold carrier of FIG. 3 with the preform;

FIG. 6 shows a perspective view of the closed mold carrier of FIG. 3 with the preform;

FIG. 7 shows a plan view of an open mold carrier according to another embodiment of the invention, wherein a two-part holding element is provided;

FIG. 8 shows a plan view of the open mold carrier of FIG. 7, wherein the holding element is closed;

FIG. 9 shows a plan view of the mold carrier of FIG. 7, wherein the mold carrier and the holding element are closed;

FIG. 10 shows a perspective view of the mold carrier of FIG. 7, wherein the mold carrier and the holding element are open;

FIG. 11 shows a perspective view of the mold carrier of FIG. 7, wherein the mold carrier is open and the holding element is closed;

FIG. 12 shows a perspective view of the mold carrier of FIG. 7, wherein the mold carrier and the holding element are closed;

FIG. 13 shows a plan view of an open mold carrier according to a further embodiment of the invention, wherein a neck plate serves as the holding element;

FIG. 14 shows a plan view of the open mold carrier of FIG. 13, wherein the holding element is closed;

FIG. 15 shows a plan view of the mold carrier of FIG. 13, wherein the mold carrier and the holding element are closed;

FIG. 16 shows a perspective view of the mold carrier of FIG. 13, wherein the mold carrier and the holding element are open;

FIG. 17 shows a perspective view of the mold carrier of FIG. 13, wherein the mold carrier is not completely closed and the holding element is completely closed;

FIG. 18 shows a perspective view of the mold carrier of FIG. 13, wherein the mold carrier and the holding element are closed;

Figure 3:
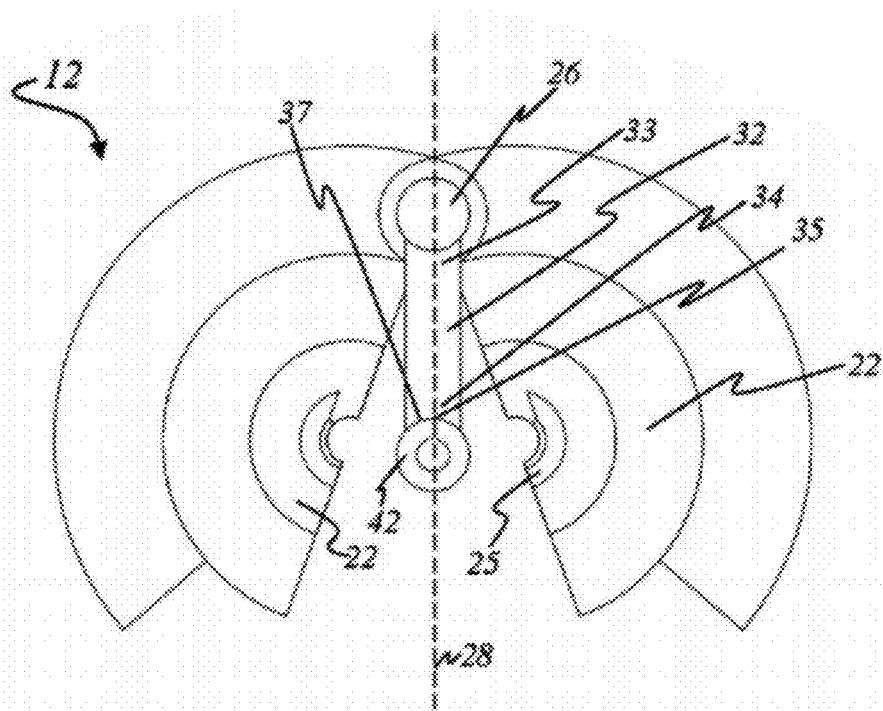
FIG. 3 shows a plan view of an open mold carrier according to one embodiment of the invention, wherein a one-part holding element is provided.

Identical references are used for elements of the invention which are identical or which have the same function. Furthermore, for the sake of clarity, the individual figures contain only the references necessary for describing the respective figure.

DETAILED DESCRIPTION OF THE INVENTION

FIG. 1 shows a schematic view of an apparatus 1 according to the prior art, by means of which containers (not shown), for example plastic bottles, can be produced essentially by means of a stretch-blow molding process. The apparatus 1 consists essentially of a processing device 60, which is designed as an oven 2. In the oven 2, preforms (not shown) for the containers to be produced are brought to a defined temperature so that the containers can be produced from these preforms using the blow molding process or stretch-blow molding process. The blow molding machine 3 is connected to the oven 2. Provided in the oven 2 is a conveying device 4 which guides a plurality of preforms past a heating device 5. Towards the interior of the oven 2, the transport device 4 is shielded by means of heat-reflecting tiles 6. The preforms are introduced into the oven 2 at a transfer position 7. At an output position 8, the heated preforms are transferred to an input position 9 for the blow molding machine 3.

The preforms are transferred from the input position 9 to the blow molding machine 3 along a transfer section 30 shown as a curved arrow.

In the diagram shown in FIG. 1, the blow molding machine 3 comprises a transport device 11, to which a plurality of mold carriers 12 is arranged. In the schematic diagram of the blow molding machine 3 shown here, the transport device 11 is designed as a wheel. It is also conceivable that the transport device 11 is designed in an essentially linear manner, without departing from the scope of protection of the invention.

At an output position 10 of the blow molding machine 3, the finished containers are output to a further processing device (not shown), for example a filling system.

FIG. 2 shows a schematic diagram of one embodiment of a holding element 32 of a mold carrier 12 according to the invention (see for example FIG. 3). The holding element 32 transfers a preform 16 from the input position 9 of the blow molding machine 3 via the transfer section 30 to the blow molding machine 3. In the embodiment shown here, the holding element 32 consists essentially of one part. Via the transport device 11 of the blow molding machine 3, the preform 16 is fed to the stretch-blow molding process.

As described above, during the phase of transfer of the preform 16, the movement direction thereof changes, so that the resulting transfer section 30 runs in a non-linear and curved manner.

The diagrams shown in FIGS. 3-20 show different embodiments of the mold carrier 12 according to the invention in plan view, side view and perspective view, in each case open and closed, in order to better illustrate the mold carrier 12 and the method according to the invention.

FIG. 3 shows a plan view of an open mold carrier 12 according to the invention with a multi-part blow mold 22 and a one-part holding element 32. The mold carrier 12 is likewise of multi-part construction and carries the multi-part blow mold 22, which in the embodiment of the invention shown here consists of two halves which are opened and closed by pivoting around an axis 26 of the mold carrier 12.

This figure also shows the situation of the method according to the invention for transferring the preform 16 in which the mold carrier 12 has firstly been pivoted apart around the axis 26 and then the preform 16 has been transferred to the mold carrier 12. A neck plate 24 of the blow mold 22 forms the upper end of the blow mold 22. In the next step, the mold carrier 12 must be closed (see FIGS. 4 and 7) in order then to start the stretch-blow molding process for the preform 16.

The holding element 32 is arranged between the axis 26 and the preform 16 positioned in the mold carrier 12. Here, the first end 33 of the holding element 32 is connected to the axis 26 and the second end 34 has a holder 35, the inner edge 37 of which adjoins part of the preform 16 without gaps i.e. circumferentially around the periphery of preform 16 with no gaps in the inner edge. The holding element 32 and thus also the preform 16 held in the holding element 32 are arranged essentially in an axis of symmetry 28 of the mold carrier 12. The preform 16 is supported by a support element 42 from above and parallel to the axis 26 (see also FIGS. 5 and 6). In the plan view, the preform 16 with its carrying ring 20 is not visible because the support element 42 is arranged above the preform 16 to the holding element 32. In the form shown here, the support element 42 has in its center an outlet (no reference sign). This outlet cooperates for example with a piston which exerts a force on the support element 42 and thus pushes the support element 42 in the direction of the preform 16.

The carrying ring 20 of the preform 16 rests on a region of the second end 34 of the holding element 32. On the whole, therefore, the preform 16 is held securely while the mold carrier 12 is in the open state.

The length of the inner edge 37 of the holder 35 is less than half the circumference of the preform 16. In addition, the shape of the inner edge 37 of the holder 35 is matched to the outer shape of the preform 16. On the whole, therefore, the preform 16 fits into the holder 35 without gaps.

Figure 4:
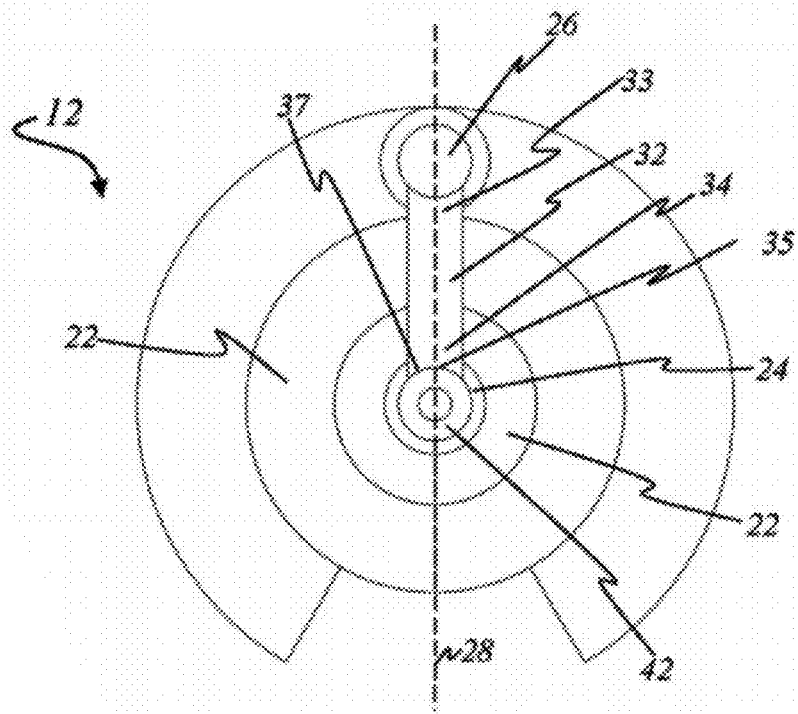
FIG. 4 shows a plan view of the closed mold carrier of FIG. 3.

FIG. 4 shows a plan view of the closed mold carrier 12 with the blow mold 22 and the one-part holding element 32 of FIG. 3. All the elements have already been described in the description relating to FIG. 3. This figure shows the situation of the method according to the invention for transferring the preform 16 in which the mold carrier 12 has been pivoted together around the axis 26, once the preform 16 has been gripped by the holding element 32. The mold carrier 12 is thus now closed. The holding element 32 is securely positioned in the likewise closed blow mold 22 and forms part of the neck plate 24 of the blow mold 22 and thus also part of the blow mold 22. The stretch-blow molding process for the preform 16 can then begin. The preform 16 (not shown) is located in the blow mold 22 below the support element 42, as already described above.

FIG. 5 shows a perspective view of the open mold carrier 12 of FIG. 3 according to the invention with the preform 16. This figure shows the situation of the method according to the invention for transferring the preform 16 in which the mold carrier 12 has firstly been pivoted apart around the axis 26 and then the preform 16 has been transferred to the mold carrier 12. A neck plate 24 of the blow mold 22 forms the upper end of the blow mold 22. In the next step, the mold carrier 12 must be closed (not shown) in order then to begin the stretch-blow molding process for the preform 16. All the other elements have already been described in the description relating to FIGS. 3 and 4. The axis 26 of the mold carrier 12 and a longitudinal axis 27 of the preform 16 are essentially parallel.

FIG. 6 shows a perspective view of the closed mold carrier 12 of FIGS. 3 and 5 with the preform 16. This figure shows the situation of the method according to the invention for transferring the preform 16 in which the mold carrier 12 has been pivoted together around the axis 26 once the preform 16 has been placed in the holding element 32. As already described above, the stretch-blow molding process for the preform 16 can now begin. In the illustrated embodiment, the holding element 32 is in particular part of the neck plate 24 of the blow mold 22. All the other elements have already been described in the description relating to FIGS. 3-5.

For the following descriptions of the individual method steps for transferring the preforms 16 to the blow molding machine 3 and the mold carrier 12 according to the invention, in some cases no reference is made to those elements of the mold carrier 12 which have already been described in the descriptions relating to the previous figures, in order to ensure clarity of the subsequent figures.

FIG. 7 shows a plan view of an open mold carrier 12 according to another embodiment of the invention, wherein the mold carrier 12 comprises a blow mold 22 with a two-part holding element 32, which is open. The two-part holding element 32 is designed as a pair of tongs, which is open in order to grip the preform 16. The length of the inner edge 37 of the holder 35 is longer than half the circumference of the preform 16. Apart from this, all the elements are described in the description relating to FIG. 3.

FIG. 8 shows a plan view of the open mold carrier 12 of FIG. 7, wherein the holding element 32 has been closed once the preform 16 has been actively gripped by the holding element 32. The halves of the blow mold 22 are still open. Apart from this, all the elements are described in the description relating to FIG. 3.

FIG. 9 shows a plan view of the mold carrier 12 of FIG. 7, wherein the mold carrier 12 together with the blow mold 22 has been closed once the preform 16 has been securely positioned in the holding element 32. Apart from this, all the elements are described in the description relating to FIG. 4.

FIGS. 10-12 show perspective views of the method steps shown in FIGS. 7-9.

FIG. 13 shows a plan view of an open mold carrier 12 according to a further embodiment of the invention, wherein the mold carrier 12 comprises a two-part neck plate 24 which is open and forms the holding element 32 for the preform 16. The advantage of this embodiment is that, unlike in the embodiments shown in FIGS. 3-12, there is no need to provide an additional element as the holding element 32 for the blow mold 22, but rather the neck plate 24 already present on the blow mold 22 is used as the holding element 32. As in the embodiment in FIGS. 7-12, the holding element 32 here is also in two parts, consisting of the two neck plate halves 25. In order to introduce the preform 16 into the holding element 32, the holding element 32 and the mold carrier 12 must first be opened. Once the preform 16 has been securely positioned in the holding element 32, the holding element 32 is closed, with the two-part blow mold 22 still remaining partially open (see FIG. 14). Finally, the mold carrier 12 is also completely closed (see FIG. 15).

During the opening and closing of the neck plate halves 25, these are guided along a circular arc section 29, wherein the center point of the associated circle lies in the axis 26.

If the neck plate halves 25 are mounted in a fixed position to the respective half of the blow mold 22 and if no support and guidance of the preform 16 along the longitudinal axis 27 is provided, for example by a support element 42 (not shown in FIGS. 13-18; see FIG. 19) or a groove 40 (see FIG. 20), the two neck plate halves 25 should simultaneously grip the preform 16 in order to securely position and hold the preform 16. If, on the other hand, a longitudinal axial support of the preform 16 is also provided in addition to the radial support, then it is sufficient to supply the preform 16 first to just one of the two neck plate halves 25, securely position and hold it there and only then to close the neck plate halves 25.

FIGS. 16-18 show perspective views of the method steps shown in FIGS. 13-15.

Figure 19:
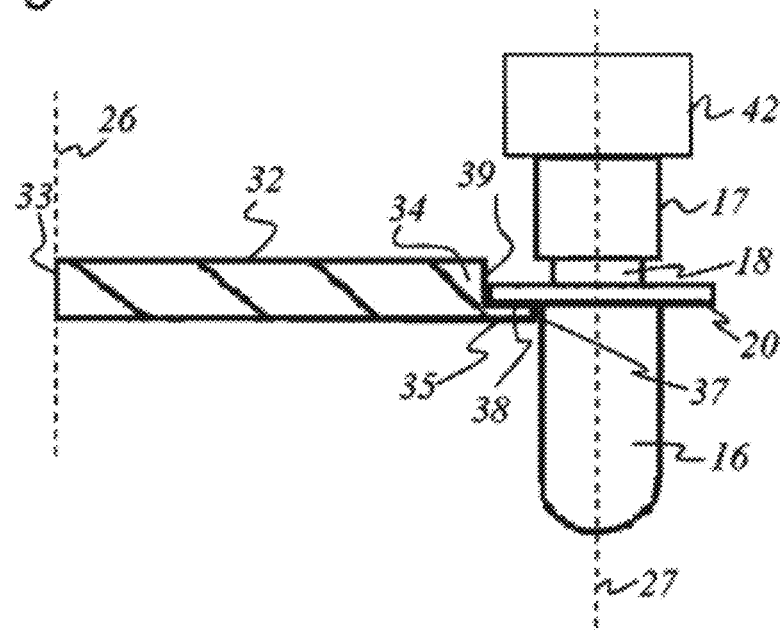
FIG. 19 shows a side view of a holding element of the mold carrier with a support element; and, FIG. 20 shows a side view of a holding element which has a stop with a groove.

FIG. 19 shows a side view of a holding element 32 of one embodiment of the mold carrier 12 according to the invention, wherein a support element 42 guides and supports the preform 16 from above. The holding element 32 holds the preform 16. In the embodiment, the holder 35 at the second end 34 of the holding element 32 has a stop 39, so that the carrying ring 20 of the preform 16 is positioned against the stop 39 at its outer edge. The holder 35 of the holding element 32 also has a rest 38, against which the carrying ring 20 rests. The neck 18 and the head 17 of the preform 16 are located above the carrying ring 20, and the neck 18 and the head 17 ought not to be deformed during the stretch-blow molding process.

The support element 42 holds the preform 16 from above along the longitudinal axis 27 of the preform 16. The support element 42 thus also fixes the carrying ring 20 of the preform 16 from above against the holding element 32. The axis 26 of the blow mold 22 is essentially parallel to the longitudinal axis 27 of the preform 16.

It is furthermore conceivable that the support element 42 actively introduces the preform 16 into the holding element 32 when the mold carrier 12 is open. Accordingly, the support element 42 can actively remove from the holding element 32 the container 21 produced from the preform 16 and supply it for further processing.

As already described above, in the case of a two-part holding element 32, the preform 16 is either gripped simultaneously by the two holding element halves 44 of the holding element 32 and the holding element 32 is closed, or else the preform 16 is first supplied only to one holding element half 44 and then the preform 16 is held in the two holding element halves 44 of the holding element 32 by closing the holding element 32.

In the previously described embodiments of one-part or two-part holding elements 32 in the form of tongs or as neck plate halves 25 or in some other multi-part form, the support element 42 is suitable whenever only a radial guidance or support of the preform 16 is provided but a longitudinal axial support is likewise required for secure guidance, positioning, holding and removal.

Figure 20:
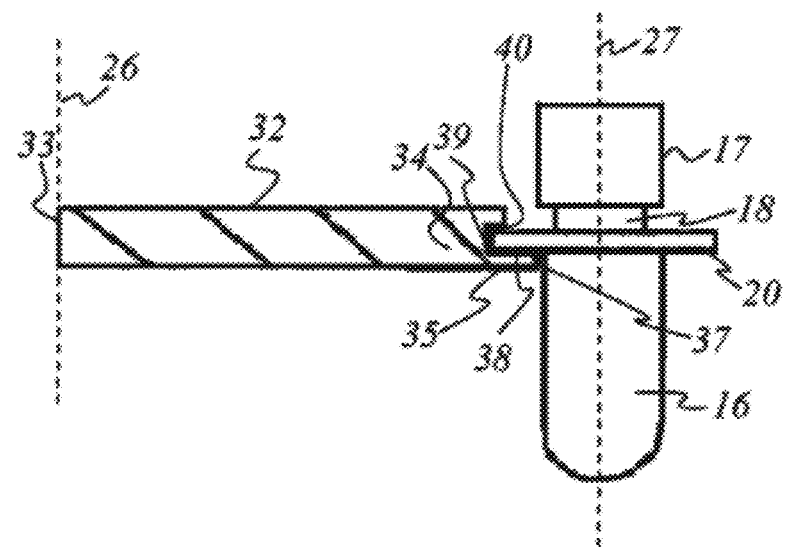

FIG. 20 shows a side view of a holding element 32 which has at its second end 34 a stop 39 comprising a groove 40. The carrying ring 20 is thus supported and clamped by the groove 40 and the rest 38 along the longitudinal axis 27, so that it is securely positioned.

Finally, it should be noted in particular, that the previously described exemplary embodiments, only serve to describe the teachings claimed, and are not limiting to the exemplary embodiments. It is conceivable however for someone skilled in the art, that variations and modifications of the invention can be made without departing from the scope of protection of the appended claims.

What is claimed is:

1. A mold carrier for at least one preform the mold carrier comprising at least one multi-part blow mold comprising a neck plate forming at least a part of the upper end of the at least one multi-part blow mold; and a multi-part holding element, wherein the multi-part holding element holds the preform while the mold carrier is in an open state;

wherein the multi-part holding element forms at least part of the at least one multi-part blow mold in a closed state of the mold carrier; and, wherein the preform is held by the multi-part holding element from only a circumferential direction of the preform.

2. The mold carrier according to claim 1 wherein the neck plate and the at least one multi-part blow mold have a common vertical pivoting axis being part of the at least one multi-part blow mold.

3. The mold carrier according to claim 1 wherein the neck plate is arranged in the closed state of the mold carrier such that a head and/or a neck of the preform are held above the neck plate and not deformed during the stretch-blow molding process.

4. An apparatus for expanding preforms into bottles comprising an oven for heating preforms;
a blow molding machine; and
a transfer device for transporting the heated preforms from the oven to the blow molding machine along a curved transport path;
wherein the blow molding machine comprises:
a mold carrier for at least one preform;
the mold carrier comprising:
at least one multi-part blow mold
comprising a neck plate forming at least a part of the upper end of the at least one multi-part blow mold; and
a multi-part holding element;
wherein the multi-part holding element holds the preform while the mold carrier is in an open state;
wherein the multi-part holding element forms at least part of the at least one multi-part blow mold in a closed state of the mold carrier; and
wherein the preform is held by the multi-part holding element only from a circumferential direction of the preform.

5. An apparatus for expanding preforms into bottles comprising:

an oven for heating preforms;
a blow molding machine; and
a transfer device for transporting the heated preforms from the oven to the blow molding machine along a curved transport path;
wherein the blow molding machine comprises:
a mold carrier for at least one preform;
the mold carrier comprising:
at least one multi-part blow mold
comprising a neck plate forming at least a part of the upper end of the at least one multi-part blow mold; and
a multi-part holding element;
wherein the multi-part holding element holds the preform while the mold carrier is in an open state;
wherein the multi-part holding element forms at least part of the at least one multi— part blow mold in a closed state of the mold carrier; and
wherein the neck plate and the at least one multi-part blow mold have a common vertical pivoting axis being part of the at least one multi-part blow mold.

* * * * *